US011550638B2

(12) United States Patent
Toksoz et al.

(10) Patent No.: US 11,550,638 B2
(45) Date of Patent: Jan. 10, 2023

(54) REDUCING LATENCY IN DOWNLOADING ELECTRONIC RESOURCES USING MULTIPLE THREADS

(71) Applicant: Google LLC, Mountain View, CA (US)

(72) Inventors: Tuna Toksoz, Mountain View, CA (US); Thomas Graham Price, San Francisco, CA (US)

(73) Assignee: Google LLC, Mountain View, CA (US)

( * ) Notice: Subject to any disclaimer, the term of this patent is extended or adjusted under 35 U.S.C. 154(b) by 246 days.

(21) Appl. No.: 16/836,319

(22) Filed: Mar. 31, 2020

(65) Prior Publication Data
US 2020/0225998 A1 Jul. 16, 2020

Related U.S. Application Data

(63) Continuation of application No. 15/034,074, filed as application No. PCT/US2016/027089 on Apr. 12, 2016, now Pat. No. 10,678,605.

(51) Int. Cl.
*G06F 9/50* (2006.01)
*G06F 9/48* (2006.01)
(Continued)

(52) U.S. Cl.
CPC ........ *G06F 9/5083* (2013.01); *G06F 16/9574* (2019.01); *H04L 47/805* (2013.01);
(Continued)

(58) Field of Classification Search
None
See application file for complete search history.

(56) References Cited

U.S. PATENT DOCUMENTS

| 6,353,813 | B1 | 3/2002 | Breese |
| 6,868,525 | B1 | 3/2005 | Szabo |

(Continued)

FOREIGN PATENT DOCUMENTS

| CN | 101582090 | | 11/2009 | |
| GB | 2534831 | A * | 8/2016 | ......... G06Q 30/0255 |

(Continued)

OTHER PUBLICATIONS

EP Office Action in European Application No. 16722726.3, dated Oct. 20, 2020, 4 pages.

(Continued)

*Primary Examiner* — Abu Zar Ghaffari
(74) *Attorney, Agent, or Firm* — Fish & Richardson P.C.

(57) ABSTRACT

Methods, systems, and apparatus, including computer programs encoded on a computer storage medium, for reducing latency in presenting content. In one aspect, a system includes a native application that presents an interactive item and a latency reduction engine. The latency reduction engine detects interaction with the interactive item that links to a first electronic resource that is different from the native application and provided by a first network domain and in response to the detecting, reduces latency in presenting the first electronic resource, including executing a first processing thread and a second processing thread in parallel. The first processing thread requests a second electronic resource from a second network domain and loads the second electronic resource and, in response to the loading, stores a browser cookie for the second network domain. The second processing thread requests the first electronic resource and presents the first electronic resource.

20 Claims, 4 Drawing Sheets

(51) Int. Cl.
  *G06F 16/957* (2019.01)
  *H04L 67/02* (2022.01)
  *H04L 47/80* (2022.01)
  *H04W 28/02* (2009.01)
  *H04L 67/50* (2022.01)
  *H04L 43/0852* (2022.01)

(52) U.S. Cl.
  CPC .......... *H04L 67/02* (2013.01); *H04W 28/0215* (2013.01); *G06F 9/4881* (2013.01); *H04L 43/0858* (2013.01); *H04L 67/535* (2022.05)

(56) References Cited

U.S. PATENT DOCUMENTS

| | | | |
|---|---|---|---|
| 6,965,913 | B2 | 11/2005 | Levitan |
| 7,493,622 | B2 | 2/2009 | Borkan |
| 7,600,028 | B2 | 10/2009 | Eriksen |
| RE41,754 | E | 9/2010 | Knight |
| 7,813,822 | B1 | 10/2010 | Hoffberg |
| 7,925,694 | B2 | 4/2011 | Harris |
| 8,131,591 | B2 | 3/2012 | Gorty |
| 8,370,908 | B2 | 2/2013 | Gillum et al. |
| 8,417,723 | B1 * | 4/2013 | Lissack .................. H04L 45/20 707/781 |
| 8,468,271 | B1 | 6/2013 | Panwar |
| 8,484,287 | B2 | 7/2013 | Gavini et al. |
| 8,539,039 | B2 | 9/2013 | Sheu |
| 8,756,660 | B2 | 6/2014 | Malakapalli |
| 8,984,164 | B2 | 3/2015 | Scoda |
| 9,032,096 | B2 | 5/2015 | Jawahar |
| 9,037,638 | B1 | 5/2015 | Lepeska et al. |
| 9,043,433 | B2 | 5/2015 | Backholnn |
| 9,083,583 | B1 | 7/2015 | Roskind |
| 9,152,970 | B1 * | 10/2015 | Trahan ............... G06Q 30/0601 |
| 9,313,100 | B1 * | 4/2016 | Jenkins ............... H04L 63/0421 |
| 9,503,499 | B1 | 11/2016 | Donaldsoon |
| 9,722,851 | B1 | 8/2017 | Hill |
| 9,723,057 | B2 | 8/2017 | Wiener |
| 9,727,534 | B1 * | 8/2017 | Buddhiraja ......... H04L 63/1441 |
| 9,736,246 | B1 | 8/2017 | Armstrong |
| 9,807,592 | B2 | 10/2017 | Rannannurthi |
| 10,165,036 | B1 * | 12/2018 | Gigliotti ................ H04L 67/10 |
| 10,243,957 | B1 * | 3/2019 | Wasiq .................... H04L 67/02 |
| 2006/0156387 | A1 | 7/2006 | Eriksen .................. H04L 67/02 726/3 |
| 2006/0184537 | A1 | 8/2006 | Sauve |
| 2009/0055908 | A1 * | 2/2009 | Rapoport ............... H04L 67/02 726/9 |
| 2009/0094377 | A1 * | 4/2009 | Zahavi .................. H04L 67/34 709/232 |
| 2009/0171950 | A1 * | 7/2009 | Lunenfeld .......... G06Q 30/0613 707/999.005 |
| 2009/0265460 | A1 * | 10/2009 | Balasubramanian ........................ G06Q 10/0833 709/224 |
| 2010/0138485 | A1 | 6/2010 | Chow et al. |
| 2010/0198911 | A1 * | 8/2010 | Zhang .................... H04L 67/01 709/224 |
| 2010/0281178 | A1 | 11/2010 | Sullivan |
| 2011/0105226 | A1 | 5/2011 | Perlman |
| 2011/0276626 | A1 * | 11/2011 | Ball ..................... G06F 16/9535 709/203 |
| 2014/0136942 | A1 | 5/2014 | Kumar et al. |
| 2014/0310779 | A1 * | 10/2014 | Lof ..................... G06F 21/6254 726/4 |
| 2015/0046558 | A1 | 2/2015 | Padgett |
| 2015/0052217 | A1 | 2/2015 | Benguerah |
| 2015/0143244 | A1 * | 5/2015 | Koo ....................... H04L 41/22 715/735 |
| 2016/0173567 | A1 * | 6/2016 | Liang .................... H04L 67/06 709/219 |
| 2016/0261699 | A1 | 9/2016 | Martin |
| 2017/0235955 | A1 | 8/2017 | Barkan |

FOREIGN PATENT DOCUMENTS

| | | | |
|---|---|---|---|
| JP | 2003-250143 | | 9/2003 |
| JP | 2004-227280 | | 8/2004 |
| JP | 2007-517283 | | 6/2007 |
| JP | 2008-225941 | | 9/2008 |
| JP | 2010-250752 | | 11/2010 |
| JP | 2013-527954 | | 7/2013 |
| JP | 2013196063 A | * | 9/2013 ......... G06Q 30/0255 |
| JP | 2015-166931 | | 9/2015 |
| JP | 5843947 | | 1/2016 |
| WO | WO 2007096603 | | 10/2007 |
| WO | WO 2014/115918 | | 7/2014 |

OTHER PUBLICATIONS

CN Office Action in Chinese Appln. No. 201680084558, dated May 21, 2021, 39 pages (with English translation).
JP Office Action in Japanese Application No. 2020-54396, dated May 24, 2021, 7 pages (with English translation).
Office Action in Japanese Appln. No. 2020-054396, dated Dec. 13, 2021, 7 pages (with English translation).
Office Action in Chinese Appln. No. 201680084558.X, dated Dec. 30, 2021, 8 pages (with English translation).
Japanese Notice of Allowance in Japanese Appln. No. 2020-054396, dated Jun. 13, 2022, 5 pages (with English translation).

* cited by examiner

REDUCING LATENCY IN DOWNLOADING ELECTRONIC RESOURCES USING MULTIPLE THREADS

CROSS-REFERENCE TO RELATED APPLICATIONS

This application is a continuation application of, and claims priority to, U.S. patent application Ser. No. 15/034,074, titled "REDUCING LATENCY IN DOWNLOADING ELECTRONIC RESOURCES USING MULTIPLE THREADS," filed on May 3, 2016, which application is a National Stage Application under 35 U.S.C. § 371(c)(2) of Patent Application No. PCT/US2016/027089, entitled "REDUCING LATENCY IN DOWNLOADING ELECTRONIC RESOURCES USING MULTIPLE THREADS," filed on Apr. 12, 2016. The disclosure of the foregoing applications are incorporated herein by reference in their entirety for all purposes.

BACKGROUND

Users access many types of information over electronic networks. For example, users access various web pages, blogs, videos, and other types of electronic resources over the Internet. As the functionality of mobile devices (e.g., smart phones and tablet computers) have improved, users are more commonly using the mobile devices to access information over the Internet. Even with such improvements, downloading information to a mobile device or other type of computing device over a network has some associated latency.

SUMMARY

This specification describes technologies relating to reducing latency and errors in obtaining, providing, and presenting requested content.

In general, one innovative aspect of the subject matter described in this specification can be embodied in methods that include the actions of detecting, by a client device, an interaction with an interactive item that is presented by a native application executing on the client device, the interactive item linking to a first electronic resource (i) different from the native application and (ii) provided by a first network domain; in response to the detecting, reducing latency in presenting the first electronic resource at the client device, including: executing, by the client device, a first processing thread that: requests a second electronic resource from a second network domain different from the first network domain; and loads the second electronic resource at the client device and, in response to the loading, stores a browser cookie for the second network domain at the client device; executing, by the client device and in parallel with the first processing thread, a second processing thread that: requests the first electronic resource from the first network domain; and presents the first electronic resource. Other embodiments of this aspect include corresponding systems, apparatus, and computer programs, configured to perform the actions of the methods, encoded on computer storage devices.

These and other embodiments can each optionally include one or more of the following features. In some aspects, loading the second electronic resource at the client device includes loading the second electronic resource in an in-application browser frame of the native application. In some aspects, the in-application browser frame shares with the web browser application a web browser cookie jar that handles the browser cookie.

Some aspects include reducing errors in presenting the first electronic resource at the client device by executing the first processing thread and second processing thread in parallel rather than waiting for the first processing thread to complete before executing the second processing thread. Some aspects include detecting a user return from the web browser application to the native application; and in response to detecting the user return, removing the in-application browser frame from the native application.

Some aspects include detecting an occurrence of a pre-specified user action after presentation of the first electronic resource, the pre-specified user action occurring using a given electronic resource, obtaining data from the browser cookie, and transmitting, using a web beacon of the given electronic resource, data specifying the occurrence of the pre-specified user action and the data obtained from the browser cookie.

In some aspects, the first processing thread opens a web browser application different from the native application and presents the first electronic resource in the web browser application.

Particular embodiments of the subject matter described in this specification can be implemented so as to realize one or more of the following advantages. When an interactive item that links to an electronic resource is selected at a client device, the electronic resource can be obtained and presented/provided to the client device directly in accordance with methods described herein. The methods result in a reduction in latency in presenting the electronic resource at the client device and a reduction in errors that are associated with at least some existing techniques (e.g., network communication failures, broken links, down servers, or response timeouts), which traditionally require a redirect process to complete storing a browser cookie on a client device.

By requesting and presenting the electronic resource linked to by the interactive item in parallel with, or prior to, obtaining and storing the browser cookie on the client device, as proposed herein, errors that may result from obtaining the browser cookie may not delay or prevent presentation of the requested electronic resource. In this way, if an error occurs attempting to retrieve an electronic resource for storing the browser cookie, the browser cookie may not be stored at the client device but the requested electronic resource may be presented at the client device without delay caused by the error. This improves the functioning of the client device (or any other computer) by making the client device less susceptible to network errors or other errors that may inhibit presentation of content by the computer.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
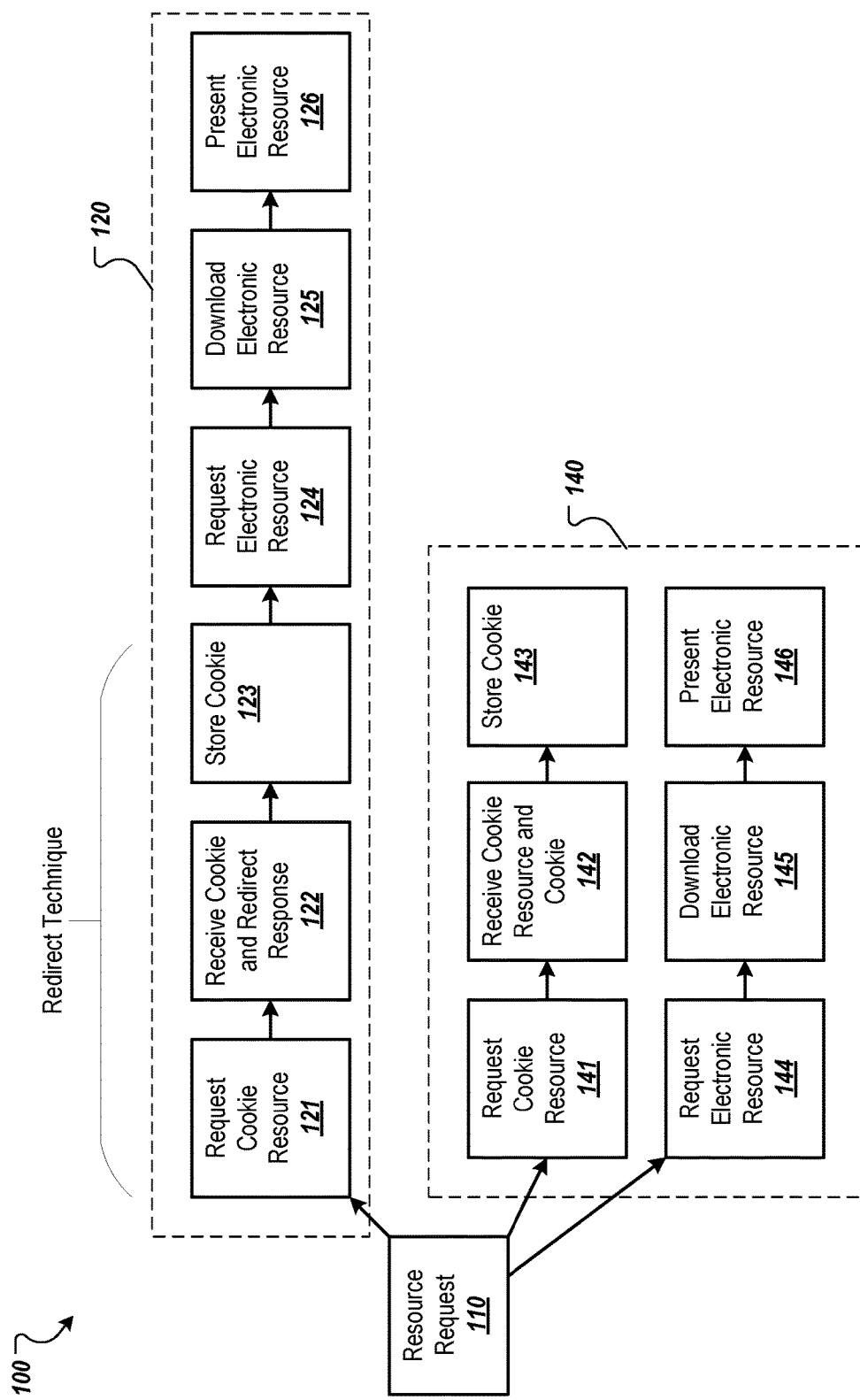
FIG. 1 is a block diagram depicting example process flows for requesting and presenting an electronic resource.

Systems and methods described herein are concerned with requesting electronic resources over a communication network. Some methods of requesting or accessing electronic resources over a network such as the Internet make use of known redirect processes on a browser of a device that is requesting the resource. Such methods suffer from associated latency in presenting the resource at the client device and have been found to be subject to errors. Accordingly, there exists a need for alternative methods and systems of requesting electronic resources, e.g., including for but not limited to accessing and/or downloading content, with reduced latency and less susceptibility to errors, when compared to other techniques.

Systems and techniques for requesting electronic resources described herein reduce the latency in presenting an electronic resource (e.g., web page or electronic document) at a client device after selection of an interactive item that includes a link to the electronic resource. For example, a user may select (e.g., interact with) an interactive item presented by a native application that is executing on the client device. In response to the selection, the client device may request, obtain, and present the electronic resource linked to by the selected interactive item. The electronic resource may be presented within a user interface of the native application (e.g., in an in-app browser frame or window of the application) or in a web browser application. An in-app browser frame is a browser frame that is presented within a user interface of an application. An example of an in-app browser frame is a Chrome Custom Tab provided by the Chrome web browser.

A browser cookie may also be downloaded by the client device and stored on the client device in response to the selection of the interactive item. For example, the browser cookie may be placed on the client device by a remote server, and the cookie may store (1) data related to the electronic resource linked to by the selected interactive item, (2) data related to the selection itself, e.g., the time at which the selection occurred or a unique identifier for the selection, and/or (3) data related to the interactive item that was selected. As cookies store at least some data that may be considered private, web browsers generally do not allow network domains (e.g., web domains) to store or access a browser cookie for a different domain. Thus, if a third party is used to provide interactive items that are integrated with electronic resources provided by a different party and the third party also manages cookies for publishers of the electronic resources, a web domain of the third party generally must store and retrieve content of the browser cookie rather than the publisher of the electronic resource. In this example, a redirect technique can be used to store the third party cookie when the user device requests an electronic resource of a publisher.

For instance, some methods of requesting or accessing electronic resources over a network such as the Internet make use of redirect techniques on a browser of a device that is requesting the resource. As described below, such methods suffer from associated latency in presenting the resource at the client device and have been found to be subject to errors. Accordingly, there exists a need for alternative methods and systems of requesting electronic resources i.e. including for but not limited to accessing and/or downloading content, with reduced latency and less susceptibility to errors, when compared to existing techniques.

Some methods of requesting electronic resources use redirect techniques, a web browser of the client device can first be directed to the web domain of the third party before being redirected (e.g., using an HTTP redirect instruction) to the web domain of the electronic resource linked to by the selected interactive item. A server in the web domain of the third party can place the browser cookie on the client device, and provide data (e.g., machine executable instructions) to the web browser of the client device that automatically causes the web browser to navigate to the web domain of the electronic resource linked to by the selected interactive item. The client device can then download the electronic resource from the web domain and present the electronic resource in a display of the client device, e.g., to the user that selected the interactive item.

The redirect technique can delay (e.g., add latency) downloading and presenting an electronic resource after an interactive item is selected. This delay/latency can be even more noticeable on mobile devices due to mobile network transmission rates and/or the amount of time required to set up a network call (e.g., request) over a mobile network.

Embodiments, implementations, methods and techniques of requesting electronic resources are proposed for in-application interactive item selections (e.g., selections of content items presented in native applications) in which the electronic resource can be requested and presented in parallel with, or prior to, obtaining a browser cookie. For example, in one or more embodiments, the client device can execute two processing threads in parallel in response to an interactive item selection. In one processing thread, an electronic resource can be requested from the third party web domain. Once received, the electronic resource can be loaded in an in-application browser frame of the native application and the browser cookie can be stored on the client device. In another processing thread, the electronic resource linked to by the selected interactive item can be requested and presented in a web browser application (or in an in-app browser frame) of the client device.

Therefore, executing two processing threads in response to an interactive item selection that is briefly explained above and set out in greater detail below, provide the advantageous effect of enabling the electronic resource to be directly requested, i.e., without waiting for the browser cookie to be stored on the client device, thereby resulting in reductions in latency in presenting the landing page and reductions in errors associated with the redirect technique.

FIG. 1 is a block diagram depicting example process flows 120 and 140 for requesting, downloading, and presenting an electronic resource. Both process flows 120 and 140 can occur in response to a resource request 110. The resource request 110 can be a transmitted request for an electronic resource, e.g., a web page or electronic document, generated by a client device in response to user interaction with an interactive item for an electronic resource. For example, the interactive item may be an advertisement for a particular product or service and the electronic resource may be a landing page for the particular product or service. Other interactive items include audio or video clips, interactive games, or other items that provide interactive capabilities. In some implementations, visualizations of an interactive item is integrated with the electronic resource to create a composite page that is presented within the display of the client device.

The example process flow 120 includes a redirect technique that is generally completed prior to the electronic resource being requested and presented at the client device. In particular, the method of requesting electronic resources in process flow 120 includes requesting a cookie resource (e.g., a web page for placing a browser cookie) from a server in one domain (121), receiving (e.g., downloading) a browser cookie and a redirect response from the server in that domain (122), and storing the cookie on the client device (123). For example, the interactive item may include a locator or pointer (e.g., Universal Resource Locator (URL)) for a web domain of a third party (e.g., relative to a publisher of the electronic resource) that provides browser cookies. In response to the selection of the interactive item, the client device may use the locator or pointer to request the cookie resource (e.g., a web page) from the web domain of the third party. The web domain of the third party may return the browser cookie and a redirect response (e.g., an HTTP 302 redirect response) to the client device. The client device can then store the browser cookie in local memory.

The redirect response includes machine readable instructions (e.g., an HTTP redirect instruction) that automatically causes the web browser application of the client device to navigate to the electronic resource for the interactive item. For example, the redirect response may include a locator (e.g., URL) for the electronic resource and the HTTP 302 redirect code. Execution of the HTTP 302 redirect response causes the web browser to use the locator to request the electronic resource from a web domain that provides the electronic resource (124). The client device then downloads the electronic resource from the web domain (125) and presents the electronic resource in a graphical display of the client device (126).

The redirect technique of the method of requesting electronic resources in the process flow 120 can take some time to complete and suffers from the drawbacks described herein. By waiting for the redirect technique to complete before requesting the electronic resource, some additional latency is created between the time the interactive item is selected and the time the electronic resource is presented at the client device (e.g., beyond the time required to directly download and present the electronic resource absent the redirect technique). In addition, any errors that occur during the redirect technique (e.g., timeouts, link failures, or network failures) can add additional delay or prevent the electronic resource from being presented at the client device. For example, if the client device cannot connect to the web domain of the third party that provides the cookie and redirect instruction, the client device may not be able to obtain the electronic resource.

The example process flow 140 is a representation of one implementation of a method of requesting or accessing electronic resources by using two processing threads that can be executed in parallel to store a browser cookie on the client device and present the electronic resource, which will reduce the latency associated with downloading and presenting the electronic resource (e.g., relative to the redirect technique discussed above). In particular, a first processing thread requests a cookie resource (141), receives the cookie resource (142), and stores the browser cookie (143) on the client device. For example, the example process flow 140 may be performed in response to a selection of an interactive item presented by a native application (e.g., an application executing at a mobile device). As described below, a latency reduction engine can detect interaction with the interactive item and manage the execution of the two processing threads in response to detecting the interaction.

For example, the latency reduction engine can request the cookie resource from the web domain of the third party in response to detecting the selection of the interactive item, while also requesting the electronic resource from a different web domain (e.g., a server of a publisher web domain), as described in more detail below. In some implementations, the latency reduction engine initiates a controller, controller class, or other element of the native application that allows electronic resources (e.g., web pages) to be presented within the native application (e.g., in an in-app browser frame or window of the native application). When the cookie resource is received at the client device, the native application can load the cookie resource. In some implementations, the native application does not actually present the cookie resource. Instead, the cookie resource may be loaded in a 0×0 sized frame (e.g., zero pixels by zero pixels) that is initiated for storing the cookie. Or, the cookie resource may be presented in the same location where the interactive item was presented or in a full-sized browser frame in the native application. The cookie can be received with the cookie resource and stored on the client device.

A second processing thread can request the electronic resource (144), download the electronic resource (145), and present the electronic resource (146). In an implementation of an example embodiment, the second processing thread can be executed prior to the first processing thread being completed. Therefore, in some example implementations of the example embodiment, the second processing thread can be executed in parallel with the first processing thread or prior to execution of the first processing thread. In another example implementation of the example embodiment, the second processing thread may be initiated at the same time the first processing thread is initiated, before the first processing thread is initiated, or within a specified amount of time after the first processing thread is initiated.

As described below, a latency reduction engine can execute a script (e.g., portion of code) that launches or triggers the opening of a web browser application by the client device and cause the web browser application to request/download the electronic resource from a web domain that provides the electronic resource. The web browser application can download the electronic resource from the web domain and present the electronic resource to the user. The client device can minimize the native application or continue executing the native application in the background (e.g., without the native application being presented) while the web browser application is visible on the display of the client device. Or, the electronic resource may be presented in an in-app browser frame of the native application (e.g., a frame that occupies less than all of the display area of the client device display).

Figure 2:
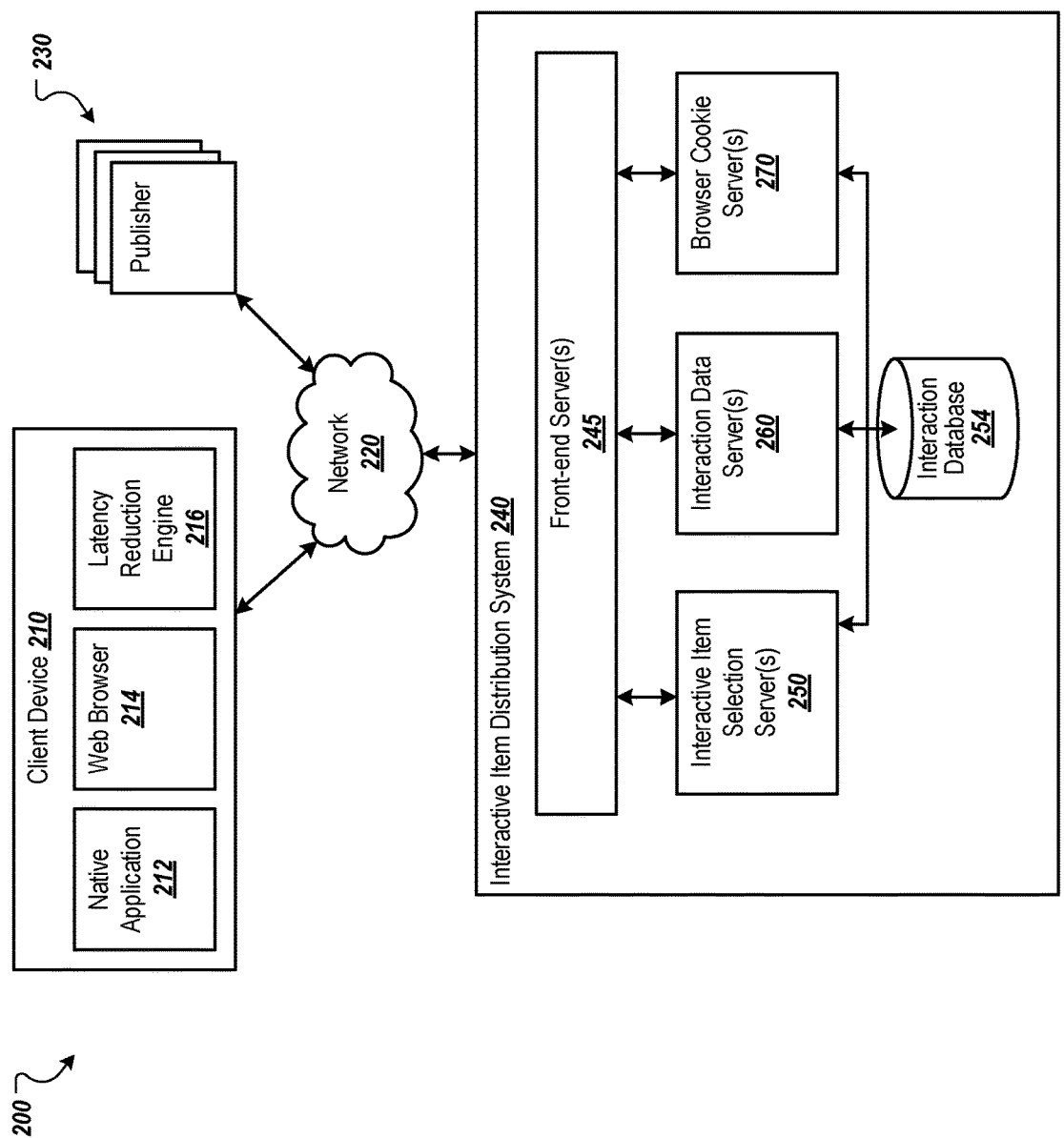
FIG. 2 is an environment in which an example interactive item distribution system distributes interactive items and maintains interaction data for the interactive items.

FIG. 2 is an environment 200 in which an example interactive item distribution system 240 distributes interactive items and browser cookies, and maintains interaction data for the interactive items. A data communication network 220 connects the interactive item distribution system 240, client devices 210, and publisher websites 230. The network 220 can include a local area network (LAN), a wide area network (WAN), the Internet, a mobile network, or a combination thereof.

A client device 210 is an electronic device that is capable of requesting and receiving electronic resources and other data over the network 220. Example client devices include personal computers, mobile communication devices (e.g., smartphones, tablet computing devices, and/or smart watches), and other devices that can send and receive data over the network 220. A client device typically includes a user application, such as a web browser 214, to facilitate the sending and receiving of data over the network 220. The web browser 214 can enable a user to interact with text, images, videos, music, and other information typically located on a web page at a website.

A client device 210 can include other applications, e.g., native applications 212. A native application is an application developed for a particular platform or a particular type of device. Example native applications include games, productivity applications, social networking applications, and applications related to corresponding websites, to name just a few examples.

The client device 210 also includes a latency reduction engine 216 that reduces the latency in requesting and presenting an electronic resource, as described in more detail below. In some implementations, the latency reduction engine 216 is included in an in-app interactive item serving software development kit (SDK). In this example, the in-app interactive item serving SDK may be a part of a native application, e.g., the native application 212, that presents interactive items within the native application. Thus, in the example, the latency reduction engine 216 may be a module of the native application 212.

A website includes one or more electronic resources associated with a domain name and hosted by one or more servers. An example website is a collection of web pages formatted in hypertext markup language (HTML) that can contain text, images, multimedia content, and programming elements, such as scripts. Each website is maintained by a content publisher 230, which is an entity that controls, manages and/or owns the website.

An electronic resource is any data that can be provided by the publisher 230 over the network 220 and that is associated with a resource address. Electronic resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (e.g., scripts). Publishers 230 can also provide native applications.

The interactive item distribution system 240 can include one or more servers, e.g., located in one or more data centers. For example, the interactive item distribution system 240 can include one or more front-end servers 245 that receive requests for interactive items and provide interactive items in response to the requests. As described in more detail below, the front-end server 245 can also receive requests for cookie resources and provide cookie resources and browser cookies in response to the requests, and receive data from browser cookies in response to specified user actions.

An interactive item includes content (e.g., visual and/or audible content) and can be presented with electronic resources (e.g., web pages and electronic documents) or applications (e.g., native applications). Interactive items can also include a link (or be associated with a link) to another electronic resource and/or code that causes a client device that is presenting the interactive item to request and present another electronic resource in response to user interaction with the interactive item. For example, an interactive item may include content for a particular product. This example interactive item may include a link to a landing page that includes more information about the product and/or that allows a user to obtain the product. When a user interacts with (e.g., selects) the interactive item, the client device may use the link to transmit a request for the landing page over the network 220 to the publisher of the publisher of the landing page, and present the landing page at the client device.

A browser cookie is a file (e.g., text file) that is sent from a website and stored on a client device by a web browser. Web browsers' typically allow a user to select whether to allow or prevent web cookies from being stored on a client device. As described above, web browsers generally do not allow a web domain to store or access a browser cookie for a different domain. Thus, if a web domain of a publisher 230 stores a browser cookie on the client device 210, a different web domain of the interactive item distribution system 240 may not be able to access the browser cookie.

The interactive item distribution system 240 can also include one or more back-end servers. For example, the interactive item distribution system 240 includes one or more interactive item selection servers 250, one or more interaction data servers 260, and one or more browser cookie servers 270. Although the interactive item selection server 250, the interaction data server 260, and the browser cookie server 270 are illustrated as being separate servers, the functionality of each server can be included in a single server. The servers can communicate over a data communication network, e.g., a LAN, a WAN, or the Internet.

The interactive item selection server 250 can receive requests for interactive items and select one or more interactive items to provide in response to each request. For example, an electronic resource provided by a publisher 230 may include an interactive item slot for presenting an interactive item. The electronic resource can include code (e.g., scripts) that causes a client device that is loading the electronic resource to transmit a request to the interactive item distribution system 240 for an interactive item to present in the interactive item slot. The interactive item selection server 250 can select interactive items and provide the selected interactive items to the front-end server 245. In turn, the front-end server 245 can provide the selected interactive items to the client device from which the request was received.

The interactive item distribution system 240 includes an interaction database 254 that stores data related to interactions with the interactive items that are provided to client devices. Such interaction data can include, for example, a number of times an interactive item has received an interaction (e.g., number of selections of the interactive item), a rate at which an interactive item has received interactions, timestamps of each interaction, a number of times a pre-specified user action has occurred after an interactive item received an interaction, and/or timestamps of the occurrence of these pre-specified user actions.

When a user of a client device 210 interacts with (e.g., selects) an interactive item, the client device 210 generates a request for an electronic resource (e.g., landing page) associated with the interactive item, which is typically a web page of the publisher. For example, the publishers 230 may include advertisers, each hosting respective web pages, some of which are landing pages. An interactive item can include a link to its associated electronic resource.

The browser cookie server 270 can provide browser cookies to client devices 210. For example, the browser cookie server 270 places a browser cookie on a client device in response to a user interaction with an interactive item at the client device. The browser cookie can include a unique identifier (e.g., identifying the client device) and data identifying the interactive item with which the user interacted, and/or other details of the user's interaction with the interactive item (e.g., the timestamp of the interaction, or a unique identifier for the interaction that can in turn be associated with further records pertaining to the interaction that may be stored in the interaction database). Example techniques for placing a browser cookie on a client device are described below.

The interaction data server 260 can obtain and store, as interaction data in the interaction database 254, conversion data for interactive items. A conversion may be recorded for an interactive item when a user performs a specified action after interacting with an interactive item, e.g., when a user buys a product after interacting with an interactive item for the product and viewing a landing page for the interactive item.

In some implementations, the interaction data server 260 receives data related to specified user actions using a web beacon (e.g., a pixel tag or code) included in electronic resources with which the specified user action occurs or electronic resources presented after the specified user action occurs. For example, pixel code may be included in the electronic resource. The pixel code can cause a web browser presenting the electronic resource to request an image from the interactive item distribution system 240. In the request, the pixel code can also cause the web browser to provide to the interactive item distribution system 240 data specifying the occurrence of the specified user action and data included in the browser cookie (or the cookie itself) stored on the client device. For example, the request may include data specifying the unique identifier of the web cookie and data specifying the interactive item for which the browser cookie was stored on the client device. In response to the request, the front-end server 245 of the interactive item distribution system 240 can provide an image (e.g., a 1×1 image) that is presented in the web browser but invisible to the user.

The latency reduction engine 216 can reduce the latency in presenting an electronic resource linked to by an interactive item. The latency reduction engine 216 can detect interactions with (e.g., selections of) interactive items presented in an application (e.g., native application 212). In response to detecting the interaction, the latency reduction engine 216 can interact with the front-end server 240 to obtain a browser cookie. The latency reduction engine 216 can also interact with a website of a publisher to request the electronic resource linked to by the interactive item.

In some implementations, the latency reduction engine 216 manages the execution of multiple processing threads to obtain the browser cookie and to request the electronic resource. In a first processing thread, the latency reduction engine 216 can obtain a browser cookie and store the browser cookie on the client device 210. For example, in response to an interaction with the interactive item, the latency reduction engine 216 may request a cookie resource from the interactive item distribution system 240. The request may include data specifying the interactive item. The front-end server 245 can receive the request and provide the request to the browser cookie server 270. The browser cookie server 270 can record a selection of the interactive item in the interaction database 254. This selection can be used to update an interaction rate or number of interactions metric for the interactive item. The browser cookie server 270 can also provide to the front-end server 245 a browser cookie and cookie resource (e.g., web page). In turn, the front-end server 245 can provide the browser cookie and the cookie resource to the latency reduction engine 216.

The latency module 216 can also load the cookie resource in an in-app browser frame of the native application 212. In some implementations, the latency reduction engine 216 loads the cookie resource in a 0×0 sized in-app browser frame such that the cookie resource is not visible to the user. By loading the cookie resource in the in-app browser frame, the latency reduction engine 216 can store the browser cookie on the client device 210 as the cookie resource and browser cookie were obtained from the same web domain.

In a second processing thread, the latency reduction engine 216 may cause the client device 210 to open the web browser 214 (or a tab of the web browser). The latency reduction engine 216 may then cause the web browser to navigate to the URL for the electronic resource. For example, the latency reduction engine 216 may obtain the URL from the interactive item with which the user interacted. The web browser 214 can use the URL to request the electronic resource from the publisher 230. Once received, the web browser 214 can present the electronic resource.

In another example, the latency reduction engine 216 may cause the electronic resource to be presented within the native application 216. For example, rather than opening the web browser 214, the latency reduction engine 216 may cause the electronic resource to be presented in an in-app browser frame of the native application 212. In this example, the latency reduction engine 216 may initiate a controller, a controller class, or other element of the native application 212 that allows electronic resources to be presented in an in-app browser frame of the native application 212.

The latency reduction engine 216 may execute the processing threads in parallel, as explained above for the first example implementation. Alternatively, or additionally, the latency reduction engine 216 may initiate the second processing thread that presents the electronic resource linked to by the interactive item prior to initiating the first processing thread that obtains the browser cookie, as explained above for the second example implementation. For example, some operating systems allow apps to continue executing in the background for a brief period of time. After opening the web browser 214, the native application 212 may continue executing in that brief amount of time to request and load the cookie resource so that the browser cookie can be stored on the client device 210.

If a specified user action occurs after the electronic resource has been presented at the client device 210, data from the browser cookie may be transmitted to the interactive item distribution system 240. For example, an electronic resource at which the action occurred (or an electronic resource presented after the action occurred) may include pixel code that causes the client device 210 to transmit data specifying the occurrence of the action and data included in the browser cookie, as described above. An example of pixel code that may be embedded in an electronic resource is "<img src="Tracking Pixel URL" style="display:none">." The front-end server 245 can receive the data and provide the data to the interaction data server 260. The interaction data server 260 can update the interaction data stored in the interaction database 254 for the interactive item based on the received data. For example, the interaction data server 260 may update a conversion rate or number of conversions for the interactive item or may record the timestamp and other appropriate details about the conversion in response to receiving the data. To allow the web browser to transmit the browser cookie or its data to the interactive item distribution system 240, the web browser 214 and the in-app browser frame of the native application 212 may share a cookie jar that manages the browser cookie.

Figure 3:
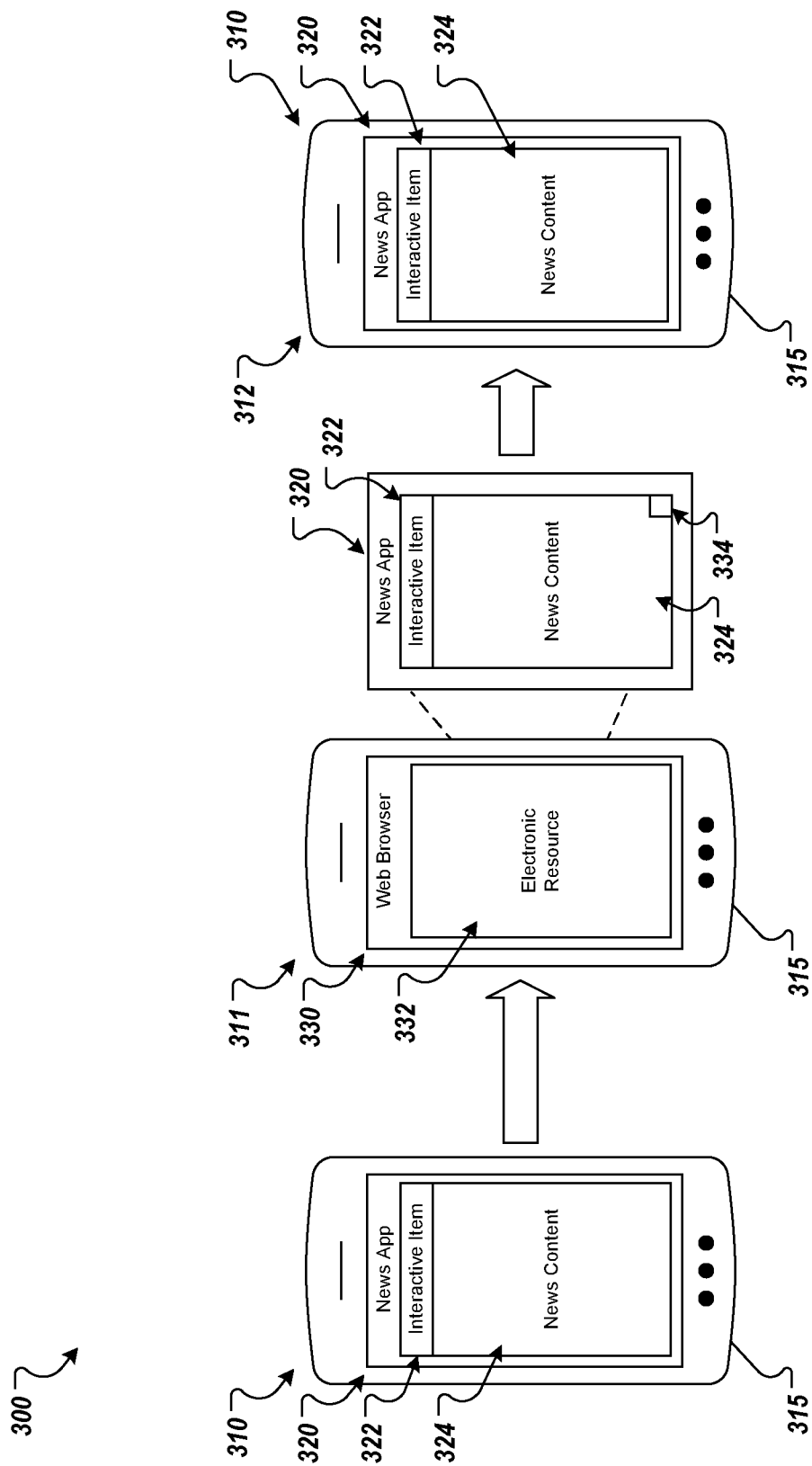
FIG. 3 is a block diagram depicting example screen shots of a mobile device when requesting and presenting an electronic resource in response to selection of an interactive item that links to the electronic resource.

FIG. 3 is a block diagram depicting example screen shots 310-312 of a mobile device 315 when requesting and presenting an electronic resource in response to selection of an interactive item that links to the electronic resource. In the screen shot 310, the mobile device 315 is presenting a news app 320 that provides news articles to users. The example news app 320 presents news content 324 (e.g., a news article) and an interactive item 322. The example interactive item 322 may include (or otherwise be associated with) a link to an electronic resource related to the interactive item 322. For example, the interactive item 322 may include a link to a landing page that includes content for a product or service depicted or described in the interactive item.

The example screen shot 311 depicts the mobile device 315 after a user has interacted with the interactive item 322. In particular, the mobile device 315 is presenting the electronic resource 332 in a web browser 330. For example, as described above, a latency reduction engine may open a web browser to present an electronic resource in response to selection of an interactive item. The web browser 330 may be the active application that is presented on the display of the mobile device 315. The mobile device 315 may minimize or continue executing the news app 320 in the background, invisible to the user of the mobile device 315.

Although invisible to the user (e.g., not visible in the display of the mobile device), the news app 334 includes an in-app browser frame 334 that presents a cookie resource. For example, the mobile device 315 may request a cookie resource in response to the user interaction with the interactive item. The cookie resource may be loaded in the in-app browser frame 334 so that a browser cookie can be stored on the mobile device 315. The in-app browser frame 334 may be small or invisible when the news app 320 is visible on the display of the mobile device 315. For example, the in-app browser frame 334 may be a 0×0 frame in pixels. In other implementations, the cookie resource may be presented in place of the interactive item 322, e.g., if the interactive item 322 is presented in an in-app browser frame.

The example screen shot 312 depicts the mobile device 315 after the user has closed the web browser 330. In this example, the mobile device 315 presents the news app 320 after the web browser is closed. The news app 320 again presents the news content 324 and interactive item 322 that was presented before the user interacted with the interactive item 322. Or, the news app 322 may present a different interactive item.

In addition, the latency reduction engine may remove the in-app browser frame 334 in response to the web browser 330 being closed or in response to the user returning to the news app 320. For example, the latency reduction engine may be configured to detect when the news app 320 is actively presented at the display of the mobile device 315. In response, the latency reduction engine may cause the news app 315 to remove the in-app browser frame 334.

Figure 4:
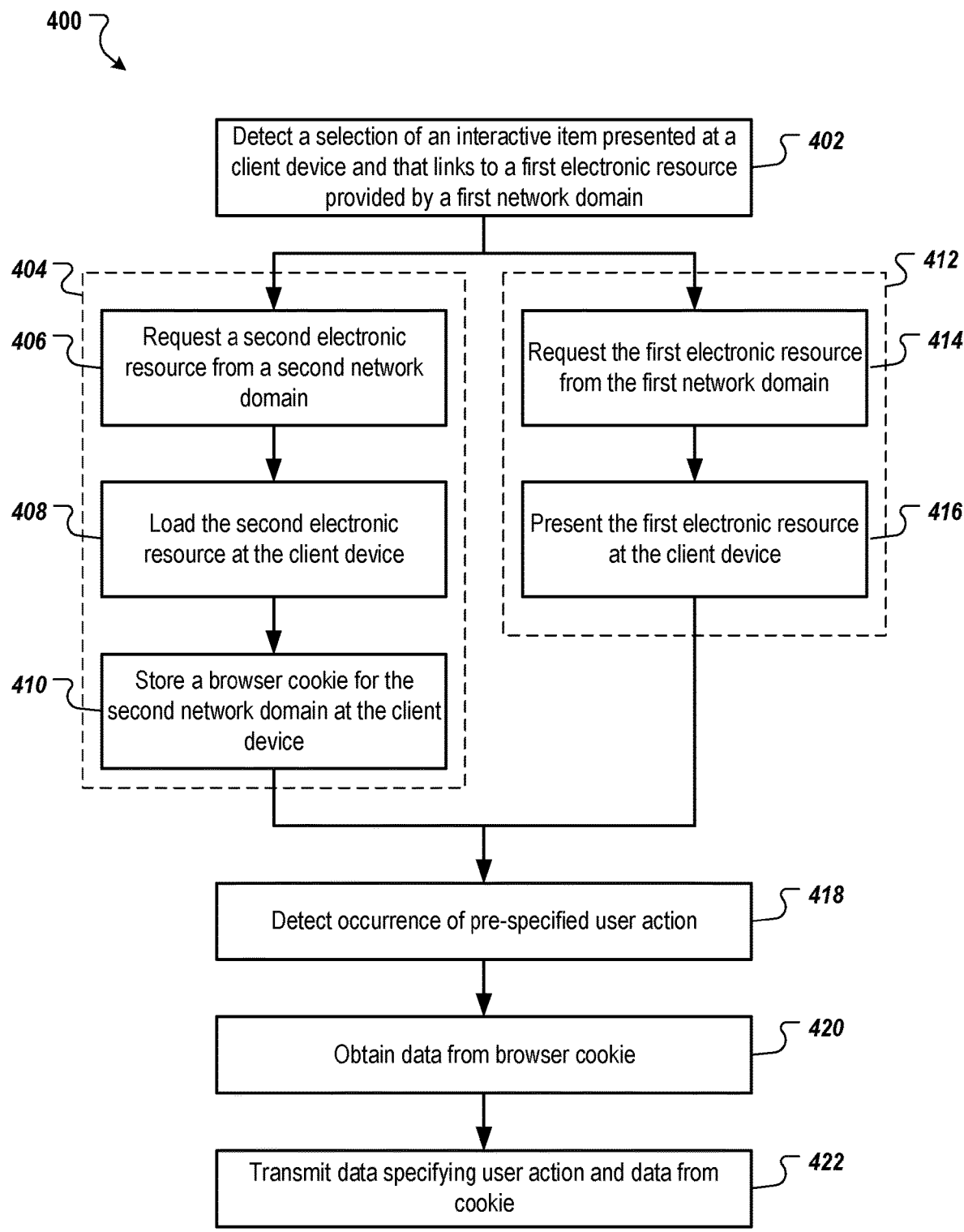
FIG. 4 is a flow chart of an example process for reducing latency in presenting an electronic resource.

FIG. 4 is a flow chart of an example process 400 for reducing latency in presenting an electronic resource. Operations of the process 400 can be implemented, for example, by a data processing apparatus, such as the interactive item distribution system 240 of FIG. 2. The process 400 can also be implemented by instructions stored on non-transitory computer storage medium, where execution of the instructions by a data processing apparatus causes the data processing apparatus to perform the operations of the process 400.

An interaction with an interactive item is detected (402). For example, the interactive item may be presented within a native application executing on a client device. A user may interact with the interactive item by selecting the interactive item. The interactive item may include a link to a first electronic resource, such as a web page or electronic document. For example, an interactive item that includes content for a particular product may include a link to a landing page that includes additional content for the particular product.

The first electronic resource may be provided by a first network domain associated with a publisher. For example, the first network domain may be a website of the publisher. In this example, the link to the first electronic resource can be a URL for the first electronic resource.

The interactive item may also include a link to a second network domain that provides browser cookies and cookie resources. For example, the second network domain may be associated with a third party that provides interactive items and/or maintains interaction data for interactive items.

A first processing thread (404) and a second processing thread (412) are executed in response to the interaction. In some implementations, the first and second processing threads are executed in parallel, as explained above for the first example implementation. In some implementations, the second processing thread is initiated prior to the first processing thread, as explained above for the second example implementation.

In the first processing thread, a second electronic resource is requested from the second network domain (406). The second electronic resource may be a cookie resource for storing a browser cookie on the client device. To request the second electronic resource, the latency reduction engine causes the native application to open an in-app browser frame and navigate to a URL of the second electronic resource. In response, the in-app browser frame may request the second electronic resource from the second network domain using the URL.

The second electronic resource is loaded at the client device (408). For example, the native application may receive the second electronic resource and load the second electronic resource in the in-app browser frame.

A browser cookie for the second network domain is stored on the client device (410). For example, the second network domain may provide a browser cookie with the second electronic resource. As the second electronic resource and the browser cookie are received from the same domain, the in-app browser frame may allow the browser cookie to be stored on the client device when the second electronic resource is loaded into the in-app browser frame.

In the second processing thread (412), the first electronic resource is requested from the first network domain (416). In some implementations, the latency reduction engine may cause the client device to open a web browser. In addition, the latency reduction engine may also parse the link to the first electronic resource that is included in the interactive item. The latency reduction engine can then cause the web browser to navigate to the link and request the first electronic resource.

The first electronic resource is presented at the client device (416). For example, the client device may receive the first electronic resource from the first network domain and present the first electronic resource using the web browser. The client device may make the web browser the active application such that the web browser and the first electronic resource are presented on the display of the client device, while the native application is minimized or sent to the background of the client device.

An occurrence of a pre-specified user action is detected after presentation of the first electronic resource (418). In some implementations, the pre-specified action is an acquisition or download of a product or service presented or described in the interactive item. The occurrence of the pre-specified action may be detected based on a web beacon (e.g., pixel code) being included in an electronic resource provided to the client device in response to the occurrence of the pre-specified action. For example, the web beacon may be included in a transaction confirmation page transmitted to the client device to confirm the acquisition or download of a product or service.

Data is obtained from the browser cookie received from the second network domain and stored on the client device (420). For example, the web beacon may include code that causes the web browser presenting the electronic resource to obtain data from the browser cookie.

Data specifying the occurrence of the pre-specified user action and the data obtained from the browser cookie are transmitted to the second network domain (422). For example, if the web beacon includes pixel code, the pixel code can cause the web browser presenting the electronic resource with the pixel code to request an image from the second network domain. In the request, the pixel code can also cause the web browser to provide to the second network domain data specifying the occurrence of the pre-specified user action and data included in the browser cookie stored on the client device. If the user returns to the native application after viewing the first electronic resource and performing the pre-specified user action, the in-app browser frame of the native application may be removed.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
   detecting, by a client device, a user interaction with an interactive item displayed within a particular electronic resource, the interactive item depicting first content within a particular area of the particular electronic resource and including a first resource locator for a first network domain comprising one or more first servers that provide a first electronic resource with additional content related to the first content and a second resource locator for a second network domain comprising one or more second servers that provide browser cookies to client devices, wherein the first network domain is different from the second network domain and wherein the user interaction is detected within the particular area of the particular electronic resource;
   in response to detecting the user interaction with the interactive item that includes the first resource locator and the second resource locator:
      executing, by the client device, a first processing thread that uses the first resource locator to obtain the first electronic resource from the first network domain and presents the first electronic resource; and
      executing, by the client device and in parallel with the first processing thread, a second processing thread that uses the second resource locator to obtain a browser cookie and a second electronic resource for setting the browser cookie from the second network domain, and loads the second electronic resource at the client device.

2. The method of claim 1, wherein executing the first processing thread comprises causing a web browser to present the first electronic resource.

3. The method of claim 2, wherein the browser cookie is specific to the second network domain and the web browser prevents domains other than the second network domain from accessing the browser cookie.

4. The method of claim 2, wherein the web browser prevents the first network domain from providing and accessing browser cookies of the second network domain in response to the first network domain being different from the second network domain.

5. The method of claim 2, wherein:
   the browser cookie is a third-party cookie provided by a third party associated with the second network domain, the third party being different from a user of the client device and a publisher entity that publishes the first electronic resource; and
   the web browser prevents third-party cookies from being downloaded from domains other than the second network domain associated with the third party; and
   the web browser allows the second network domain associated with the third party to download third party cookies provided by the third party to the client device.

6. The method of claim 2, wherein:
- detecting the user interaction comprises detecting the user interaction at a user interface of a native application that presents the interactive item; and
- executing the second processing thread comprises loading the second electronic resource in an in-application browser frame of the native application.

7. The method of claim 6, wherein the in-application browser frame shares with the web browser application a web browser cookie jar that handles the browser cookie.

8. The method of claim 6, further comprising:
- detecting a user return from the web browser to the native application; and
- in response to detecting the user return, removing the in-application browser frame from the native application.

9. The method of claim 6, further comprising:
- detecting an occurrence of a pre-specified user action after presentation of the first electronic resource, the pre-specified user action occurring using a given electronic resource;
- obtaining data from the stored browser cookie, the obtained data including at least one of (i) data related to first electronic resource, (ii) data related to the user interaction with the interactive item, or (iii) data related to the interactive item; and
- transmitting, using a web beacon of the given electronic resource, data specifying the occurrence of the pre-specified user action and the data obtained from the browser cookie to a server of the second network domain.

10. A system, comprising:
- a data processing apparatus; and
- a memory storage apparatus in data communication with the data processing apparatus, the memory storage apparatus storing instructions executable by the data processing apparatus and that upon such execution cause the data processing apparatus to perform operations comprising:
  - detecting, by a client device, a user interaction with an interactive item displayed within a particular electronic resource, the interactive item depicting first content within a particular area of the particular electronic resource and including a first resource locator for a first network domain comprising one or more first servers that provide a first electronic resource with additional content related to the first content and a second resource locator for a second network domain comprising one or more second servers that provide browser cookies to client devices, wherein the first network domain is different from the second network domain and wherein the user interaction is detected within the particular area of the particular electronic resource;
  - in response to detecting the user interaction with the interactive item that includes the first resource locator and the second resource locator:
    - executing, by the client device, a first processing thread that uses the first resource locator to obtain the first electronic resource from the first network domain and presents the first electronic resource; and
    - executing, by the client device and in parallel with the first processing thread, a second processing thread that uses the second resource locator to obtain a browser cookie and a second electronic resource for setting the browser cookie from the second network domain, and loads the second electronic resource at the client device.

11. The system of claim 10, wherein executing the first processing thread comprises causing a web browser to present the first electronic resource.

12. The system of claim 11, wherein the browser cookie is specific to the second network domain and the web browser prevents domains other than the second network domain from accessing the browser cookie.

13. The system of claim 11, wherein the web browser prevents the first network domain from providing and accessing browser cookies of the second network domain in response to the first network domain being different from the second network domain.

14. The system of claim 11, wherein:
- the browser cookie is a third-party cookie provided by a third party associated with the second network domain, the third party being different from a user of the client device and a publisher entity that publishes the first electronic resource; and
- the web browser prevents third-party cookies from being downloaded from domains other than the second network domain associated with the third party; and
- the web browser allows the second network domain associated with the third party to download third party cookies provided by the third party to the client device.

15. The system of claim 11, wherein:
- detecting the user interaction comprises detecting the user interaction at a user interface of a native application that presents the interactive item; and
- executing the second processing thread comprises loading the second electronic resource in an in-application browser frame of the native application.

16. The system of claim 15, wherein the in-application browser frame shares with the web browser application a web browser cookie jar that handles the browser cookie.

17. The system of claim 15, wherein the operations comprise:
- detecting a user return from the web browser to the native application; and
- in response to detecting the user return, removing the in-application browser frame from the native application.

18. The system of claim 15, wherein the operations comprise:
- detecting an occurrence of a pre-specified user action after presentation of the first electronic resource, the pre-specified user action occurring using a given electronic resource;
- obtaining data from the stored browser cookie, the obtained data including at least one of (i) data related to first electronic resource, (ii) data related to the user interaction with the interactive item, or (iii) data related to the interactive item; and
- transmitting, using a web beacon of the given electronic resource, data specifying the occurrence of the pre-specified user action and the data obtained from the browser cookie to a server of the second network domain.

19. A non-transitory computer storage medium encoded with a computer program, the program comprising instructions that when executed by data processing apparatus cause the data processing apparatus to perform operations comprising:
- detecting, by a client device, a user interaction with an interactive item displayed within a particular electronic resource, the interactive item depicting first content within a particular area of the particular electronic resource and including a first resource locator for a first network domain comprising one or more first servers that provide a first electronic resource with additional content related to the first content and a second resource locator for a second network domain comprising one or more second servers that provide browser cookies to client devices, wherein the first network domain is different from the second network domain and wherein the user interaction is detected within the particular area of the particular electronic resource;

in response to detecting the user interaction with the interactive item that includes the first resource locator and the second resource locator:

executing, by the client device, a first processing thread that uses the first resource locator to obtain the first electronic resource from the first network domain and presents the first electronic resource; and executing, by the client device and in parallel with the first processing thread, a second processing thread that uses the second resource locator to obtain a browser cookie and a second electronic resource for setting the browser cookie from the second network domain, and loads the second electronic resource at the client device.

20. The non-transitory computer storage medium of claim 19, wherein executing the first processing thread comprises causing a web browser to present the first electronic resource.

* * * * *